July 16, 1929.  L. TRENTO  1,721,359
POWER TRANSMISSION
Filed July 3, 1928   2 Sheets-Sheet 1
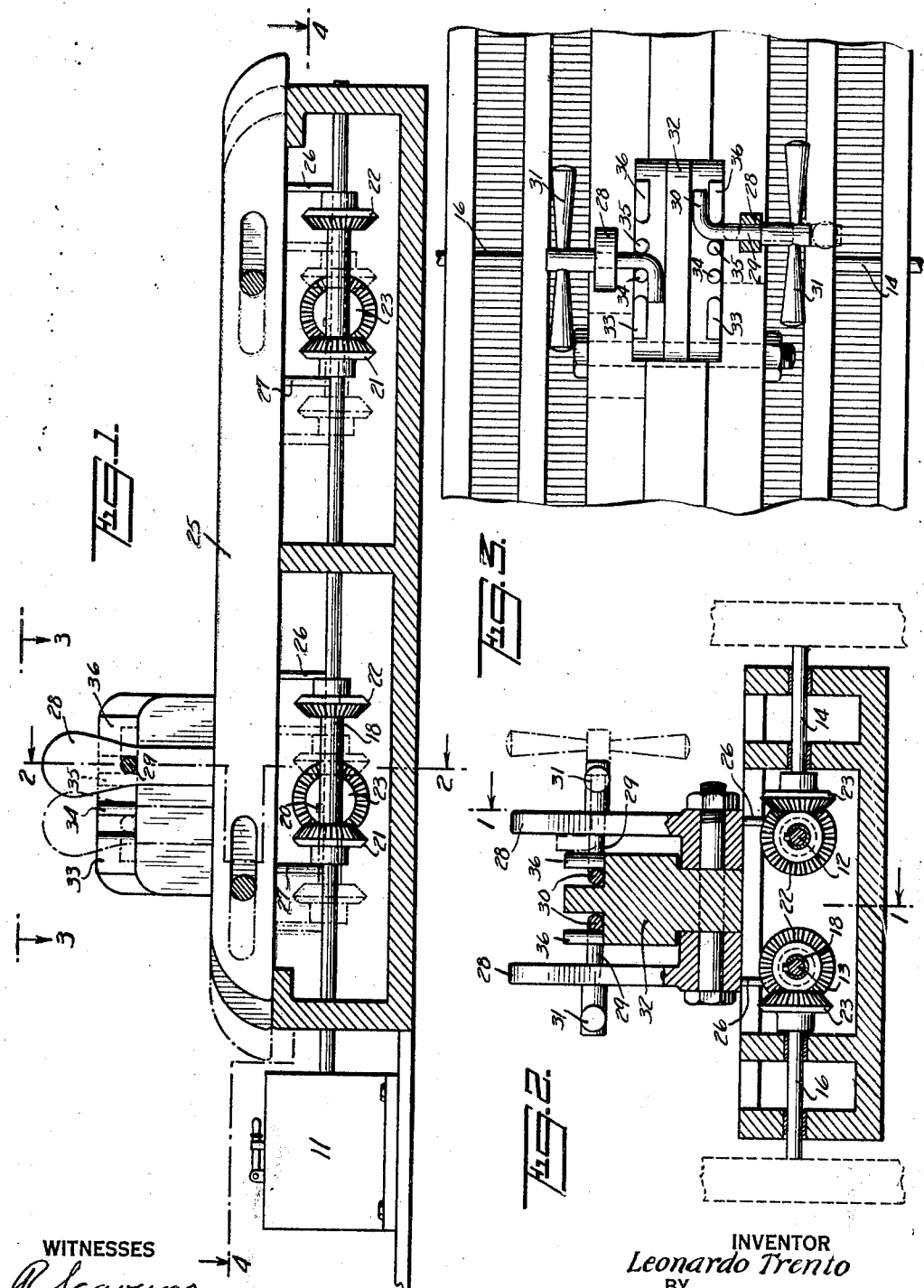
WITNESSES
INVENTOR
Leonardo Trento
BY
ATTORNEY

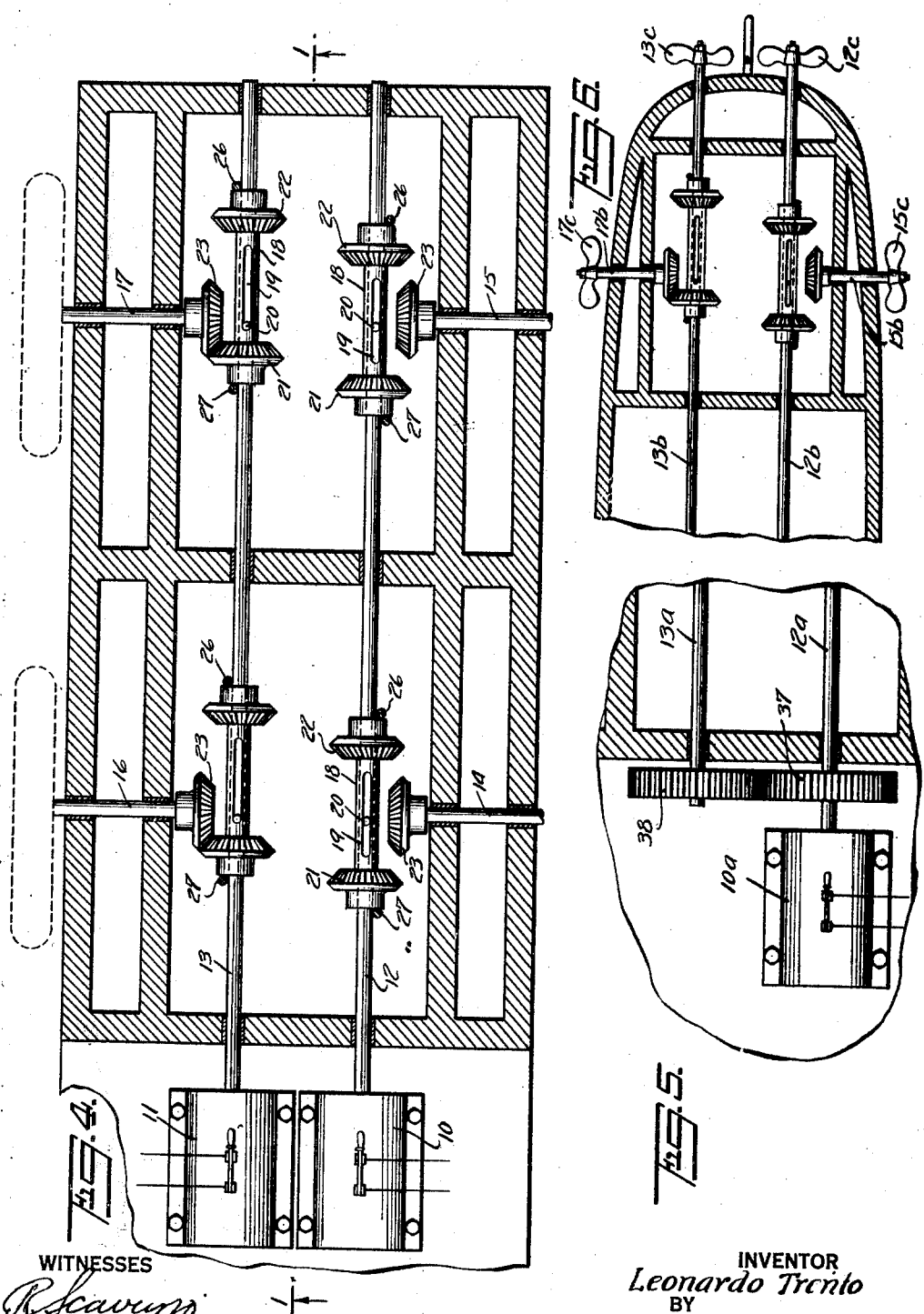

Patented July 16, 1929.

1,721,359

UNITED STATES PATENT OFFICE.

LEONARDO TRENTO, OF ARDSLEY-ON-PUTNAM, NEW YORK.

POWER TRANSMISSION.

Application filed July 3, 1928. Serial No. 290,063.

This invention relates to power transmission and contemplates an improved reversible power transmission for road, air or water vehicles.

The invention primarily comprehends a power transmission by virtue of which power may be separately transmitted from one or more prime movers to wheels, propellers, or other propelling devices on the opposite sides or ends of the vehicle.

As a further object the invention resides in a power transmission which includes a novel shifting mechanism by means of which the propelling devices may be independently coupled with the source of power for forward or reverse drive, or rendered inactive or neutral at will.

Other objects reside in the comparative simplicity of construction and mode of operation of the device and economy with which the same may be produced and the general efficiency derived therefrom.

With the above recited and other objects in view, reference is had to the following description and accompanying drawings, in which there are exhibited several examples or embodiments of the invention, while the appended claims define the actual scope of the invention.

In the drawings—

Figure 1 is a longitudinal sectional view taken approximately on the line indicated at 1—1 of Fig. 4.

Fig. 2 is a transverse sectional view taken approximately on the line 2—2 of Fig. 1.

Fig. 3 is a fragmentary plan view.

Fig. 4 is a sectional plan view taken approximately on the line 4—4 of Fig. 1.

Fig. 5 is a fragmentary sectional plan view of a slightly modified form of the invention.

Fig. 6 is a fragmentary sectional plan view illustrating an application of the invention to a boat.

Referring to the drawings by characters of reference 10 and 11 designate respectively a pair of prime movers or motors and 12 and 13 drive shafts which are operatively connected with the prime movers or motors. A plurality of driven shafts 14 and 15 are adapted to be driven from the drive shaft 12 and a plurality of driven shafts 16 and 17 are adapted to be driven from the drive shaft 13. The means for transmitting the power separately to the driven shafts from the drive shafts in opposite directions, or to render the driven shafts independently inoperative, consists in providing a tubular shaft section 18 on the drive shafts adjacent each driven shaft, which tubular shaft section is keyed thereto for turning movement therewith and slidable axially on the shaft. This connection is preferably established by means of a slot 19 and a pin 20. The opposite ends of the tubular shaft section 18 have secured thereto beveled pinions 21 and 22 which are designed to be selectively moved into mesh with a beveled gear 23 on the driven shafts 14, 15, 16 or 17. From this construction and arrangement it is obvious that when the shaft section 18 is disposed in an intermediate position whereby the pinions 21 and 22 are both out of mesh with the beveled gear 23, the driven shaft will be rendered inoperative or neutral. When the shaft section 18 is shifted to bring either of the pinions 21 or 22 into mesh with the gear 23, power will be transmitted to drive the driven shaft in opposite directions.

The mechanism for shifting the shaft section 18 and its pinions 21 and 22 comprises a slidable element or bar 25 which is provided with depending shift fingers 26 and 27 engageable with the opposite ends of the shaft section 18. The shift bar 25 is provided with an upstanding rigid handle 28 for manipulating the same and has projecting therethrough a latch 29 having an angularly disposed terminal 30. The opposite terminal is provided with means 31 for rotating and sliding the latch. A stationary member 32 is provided with upstanding projections 33, 34, 35 and 36 between adjacent pairs of which the latch element 29 is engageable to hold the shift bar 25 in its three positions. When the latch is engaged between the projections 33 and 34, the pinion 22 is in mesh with the gear 23 and the driven shaft is driven in one direction. When the latch element 29 is engaged between the projections 35 and 36, the pinion 21 is in mesh with the gear 23 to drive the driven shaft in the opposite direction. When the latch bolt 29 is disposed between the projections 34 and 35, the pinions 21 and 22 are both out of mesh with the gear 23 so that the driven shaft is in a neutral or inactive position. By rotating the latch bolt 29 on its axis through the means 31, the terminal 30 engages with one of the projections to prevent axial movement or unlatching of the shift bar.

In practice, preferably two motors or prime movers will be employed as illustrated in Fig. 4. In this instance the driven shafts 14 and 15 on one side or end of the device may be driven in opposite directions in unison, while the driven shafts 16 and 17 may be driven independently and in opposite directions or in unison.

In some instances, however, a single prime mover or motor 10<sup>a</sup> may be employed to drive both shafts 12<sup>a</sup> and 13<sup>a</sup>, and in this instance a gear 37 on the shaft 12<sup>a</sup> will mesh with a gear 38 on the shaft 13<sup>a</sup>.

As illustrated in Figure 6 of the drawings, the shafts 12<sup>b</sup> and 13<sup>b</sup>, which are operatively connected with the prime movers or motors (not shown), extend through the stern of the boat and are provided with screw propellers 12<sup>c</sup> and 13<sup>c</sup>. The driven shafts 15<sup>b</sup> and 17<sup>b</sup> are provided with screw propellers 15<sup>c</sup> and 17<sup>c</sup>. The power transmitting means is identical with that shown and described in the other figures and it is obvious from this construction that the propellers 12<sup>c</sup> and 13<sup>c</sup> may be driven in unison or independently while the propellers 15<sup>c</sup> and 17<sup>c</sup> may be driven in unison or independently in reverse directions.

I claim:

1. A gear shifting device including a shift bar having a rigid handle and detent means for retaining the shift bar in shifted relation, comprising upstanding projections on a stationary member, and a slidable and rotary latch element having an angular terminal movable to a position between an adjacent pair of projections selectively.

2. In a gear shifting device, a slidable shift bar having means engageable with the gear to be shifted, a handle rigidly connected with the shift bar and means for gauging the shifted positions of the gear and for retaining the same in said shifted positions comprising a stationary keeper having a plurality of keeper openings spaced coincident to the path of movement of the shift bar and a latch element carried by the handle and provided with an angularly disposed terminal, said latch element being shiftable transversely to the path of movement of the shift bar and rotatable, whereby the same may be selectively engaged with the keeper openings of the keeper.

3. In a gear shifting device, a longitudinally slidable shift bar operatively associated with the gear to be shifted, a rigid handle connected with the shift bar and detent means for retaining the shift bar in longitudinally shifted positions comprising longitudinally spaced stationary keepers and a transversely slidable and rotary latch element in the handle formed with an angularly disposed terminal movable to a position for selectively engaging the longitudinally spaced keepers.

4. The combination with a beveled gear mounted on a transverse shaft and a pair of reversely arranged beveled pinions splined to a longitudinal shaft, of means for shifting said pinions to selectively mesh with said gear or to assume a neutral non-meshed position with respect thereto, said means including a longitudinally slidable shift bar having operative connection with said pinions, a handle rigidly connected to the shift bar and means for gauging and retaining the gears and gear shifting means in their relatively shifted positions comprising a stationary member alongside of said shift bar handle having a plurality of upstanding projections and a slidable and rotary latch element carried by said handle for lateral shifting movement and rotation to position the element selectively between said projections with the angular terminal engaged therebehind.

LEONARDO TRENTO.